(12) United States Patent
Monson et al.

(10) Patent No.: US 8,038,097 B1
(45) Date of Patent: Oct. 18, 2011

(54) VEHICLE RECOVERY PACKAGE

(75) Inventors: Robert J. Monson, St. Paul, MN (US);
Steven H. Ernst, Apple Valley, MN (US)

(73) Assignee: Lockheed Martin Corporation, Bethesda, MD (US)

( * ) Notice: Subject to any disclaimer, the term of this patent is extended or adjusted under 35 U.S.C. 154(b) by 473 days.

(21) Appl. No.: 11/999,356

(22) Filed: Dec. 5, 2007

(51) Int. Cl.
*B64F 1/02* (2006.01)
*B64F 1/00* (2006.01)

(52) U.S. Cl. .................................................. 244/110 E

(58) Field of Classification Search .............. 244/110 R, 244/110 E, 110 F, 110 C, 100 A, 116, 107, 244/146, 905; 182/137; 441/42; 5/413 AM
See application file for complete search history.

(56) References Cited

U.S. PATENT DOCUMENTS

| | | | | |
|---|---|---|---|---|
| 5,560,568 A | * | 10/1996 | Schmittle | 244/110 E |
| 5,738,303 A | * | 4/1998 | Hamatani et al. | 244/905 |
| 6,237,875 B1 | * | 5/2001 | Menne et al. | 244/100 A |
| 7,040,572 B2 | * | 5/2006 | Munk | 244/100 R |
| 2006/0006281 A1 | * | 1/2006 | Sirkis | 244/100 A |
| 2006/0091258 A1 | * | 5/2006 | Chiu et al. | 244/119 |
| 2006/0217014 A1 | * | 9/2006 | Pierce et al. | 441/123 |
| 2007/0123141 A1 | * | 5/2007 | Berkey et al. | 446/220 |
| 2008/0191091 A1 | * | 8/2008 | Hoisington et al. | 244/110 F |

OTHER PUBLICATIONS

Dickard, H. E., Mini-RPV Recovery System Conceptual Study, Aug. 1977. pp. 22, 115, 118-124, 275, 276, 288.*

* cited by examiner

*Primary Examiner* — Tien Dinh
*Assistant Examiner* — Richard R Green
(74) *Attorney, Agent, or Firm* — Brooks, Cameron & Huebsch, PLLC

(57) ABSTRACT

The present disclosure includes various apparatus, system, and method embodiments for vehicle recovery. One embodiment includes an inflatable member for impact of a vehicle thereon, an inflation source for inflating the inflatable member, and where the inflatable member and inflation source are housed in a portable package.

16 Claims, 7 Drawing Sheets

VEHICLE RECOVERY PACKAGE

FIELD OF THE INVENTION

The present disclosure generally relates to vehicle recovery. And, in particular, the present disclosure relates to portable packages and methods for vehicle recovery.

BACKGROUND

Recovering vehicles, for example, where space for recovery may be limited, while preventing damage to the vehicle and/or its payload, which can include valuable electronic components and/or information stored thereon, is desirable in many instances. Such vehicles, which can include various unmanned aerial vehicles (UAVs) among other air, land, and/or water vehicles, can often be reused. As such, safe recovery of such vehicles can provide cost, manufacturing, supply, and/or materials savings, among other benefits.

Some current methods of recovery of UAVs include using parachutes, parafoils, nets, cable arresting devices, or a combination thereof. Some such methods and/or devices can be complicated, time consuming, difficult to erect/teardown, and/or can be difficult to integrate in hostile environments or in small areas (e.g., on a ship deck having limited area).

SUMMARY

Embodiments of the present disclosure provide various methods and apparatuses for vehicle recovery. Various embodiments provide for recovery of an aerial vehicle such as an unmanned aerial vehicle (UAV) without causing damage to the vehicle and/or its payload. In various embodiments, the apparatus can have a small footprint, can be housed in a portable package, and can be rapidly inflated to provide a vehicle recovery area. In one or more embodiments, the system can be easily deployable and portable for ease of transport, deployment, and repackaging for removal from the recovery site.

Such embodiments allow a user to retrieve a vehicle in a location that is, for instance, remote from a landing strip or military base. Embodiments, for example, can be inflated using a portable air compressor (e.g., a fan) that can be powered from a power supply such as a battery (e.g., a car battery), or using a compressed fluid canister, among other implementations.

In some embodiments, the apparatus can include an inflatable member for impact of a vehicle thereon. Embodiments can include an inflation source for inflating the inflatable member. In one or more embodiments, the inflatable member and inflation source can be housed in a portable package.

The inflation can be accomplished using any suitable fluid. For example, air or other gases can be used to inflate such embodiments. In various embodiments, liquids, such as water can be used to accomplish the inflation.

The inflatable member can be made of various materials including, for example, nylon, plastic, and/or rubber materials. In some embodiments, the material can be coated to provide enhanced durability and/or inflation properties, among other characteristics that may be suitable to an inflatable apparatus. For example, one suitable coating may be silicone. In some embodiments, the inflatable material can have a weight of around 1.0-2.0 ounces per square foot.

The inflatable member can be inflated with a fluid (e.g., a gas or liquid) provided by a number of inflation sources. Example inflation sources include a fan, blower, fluid pump, gas generator, or a compressed fluid canister (e.g., pressurized), among other inflation sources.

In addition to fluid movement components and propellants, in some embodiments, a chemical reaction can be used to produce the inflation of an inflatable member. For example, a chemical reaction can be used to produce a gas or a fluid, such as foam or a liquid that can inflate an inflatable member. Chemicals, for instance, can be provided in the portable package for embodiments involving the use of at least one of a number of chemical reactions to inflate the inflatable member.

In some embodiments, the inflation source can be an explosive source (e.g., rapid chemical reaction) such as that used to inflate an airbag in an automobile. In some such embodiments, a solid propellant can be ignited, which burns to create a large volume of gas to inflate the bag. For example, sodium azide ($NaN_3$) may be ignited to create a large volume of nitrogen gas ($N_2$). Such propellants can rapidly burn to inflate an inflatable member quickly, in some embodiments.

In some embodiments, the inflation source can be coupled to a power supply and/or may be battery operated. In some embodiments, the inflation source can be a pressure regulated compressed fluid (e.g., gas) source. The inflation source can, for example, be used to provide a pressure within the apparatus to maintain the inflatable members in an inflated state until a vehicle impacts the inflatable member. Embodiments can include an inflation source housed in the portable package.

In some embodiments, the power supply can be used to provide the power to an inflation source (e.g., a fan), ignite a propellant, or initiate a chemical reaction. Any suitable power supply for providing such functionality can be utilized in various embodiments of the present disclosure. Embodiments can include a power supply housed in the portable package.

In various embodiments, the pressure suitable to maintain an inflatable member in the inflated state can, for example, be about 3-5 pounds per square inch (psi). The pressure suitable to maintain the inflatable members in the inflated state can depend on factors such as the type of material being inflated, weight of the material being inflated, the size of the members, and/or configuration of the members, among other factors.

In various embodiments, the inflation source can serve as a deflation source for deflating the inflatable member. For example, in embodiments where the inflation source is a fan, the fan can be reversed to remove a fluid (e.g., air) from the inflatable member. Such embodiments may be used to rapidly deflate the inflatable member to assist in quickly repackaging the inflatable member in the portable package. Deflation sources are not limited to reversible fans; other embodiments are also possible.

In some embodiments, the inflation source can be coupled to the inflatable member and activated automatically upon opening of the portable package. For example, the portable package may be equipped with sensors (e.g., trip wires) that detect opening of the portable package and activate the inflation source to inflate the inflatable member. Such embodiments can be useful to reduce the amount of user interaction required to operate the apparatus and/or to more quickly operate the apparatus. Embodiments are not limited to inflatable members that automatically inflate upon opening of the portable package.

In one or more embodiments, the inflation source can be activated by operation of a switch and/or cord coupled to the inflation source and/or the power supply. For example, operation of the switch (e.g., flipping the switch) and/or cord (e.g., pulling the cord) can activate the inflation source (e.g., start a chemical reaction, activate a fan, or release a compressed gas)

to inflate the inflatable member. Embodiments using operation of a switch and/or cord, as opposed to automatic inflation upon opening of the portable package, can be beneficial in allowing a user to set up the apparatus prior to a time when inflation of the inflatable member may be necessary to recover a vehicle. For example, the inflatable member in an uninflated state and housed in a portable package may appear less conspicuous in hostile territory as may be desired until recovery of a vehicle is necessary (e.g., until a UAV is in close proximity for recovery).

In various embodiments, the apparatus can include netting attached to at least a portion of the inflatable member. In such embodiments, the netting may provide a cushioning functionality, in which the netting cushions the impact of the vehicle. In some embodiments, the netting can be used to capture the vehicle (e.g., arrest the movement of a vehicle).

In some embodiments, the apparatus can include a capture mechanism. For instance, in such embodiments, a vehicle (e.g., an UAV) can include a capture component to releasably attach with a corresponding capture component of the inflatable member and/or netting associated therewith. As an example, an UAV can have a hook and loop fastener material on its fuselage, empennage, and/or a leading edge of one or more wings, which can releasably attach to a corresponding hook and loop fastener material located on an inflatable member and/or netting of the inflatable member. Such positive capture mechanisms can, for instance, reduce and/or prevent damage to a vehicle during capture by reducing movement after the vehicle impacts the inflatable member.

In one or more embodiments, the portable package can be a hard case (e.g., a suitcase, trunk, or footlocker). Such embodiments can be useful to protect the contents of the portable package (e.g., inflatable member, inflation source, etc.), during transport (e.g., by hand or by vehicle over potentially rough terrain). Such embodiments can be useful, for example, in giving the portable package an inconspicuous appearance. Embodiments where the portable package is a hard case can include materials such as polyethylene, carbon fiber, titanium, aluminum, steel, and/or other suitable relatively hard and lightweight materials. For example, the hard case can include appropriate shielding to protect contents from enemy fire or other hazards associated with use in hostile environments.

In some embodiments, the portable package can be a soft pack (e.g., a backpack with or without a support frame). Such embodiments can give the portable package an inconspicuous appearance, as noted above. Embodiments where the portable package is a soft pack can provide for ease of transport by making the portable package more easily transportable by a single individual (e.g., a soldier). For example, embodiments where the portable package is a soft pack can include materials such as leather, canvas, nylon, ripstop, CORDURA®, KEVLAR®, and/or other suitably durable yet flexible materials.

The portable package, in one or more embodiments, can serve as at least a portion of a base for the inflatable member when the portable package is open and the inflatable member is inflated. Such embodiments can provide additional support for the inflatable member to absorb a vehicle impact with the inflatable member by reducing a likelihood and/or amount of movement of the inflatable member with the impact. Such embodiments may reduce a potential of the inflatable member to tip over upon impact.

For example, once a vehicle has impacted the apparatus, further inflation of the apparatus can cause damage to the vehicle and/or its payload. Therefore, in various embodiments, the fluid within the apparatus can be exhausted through the deflation vents upon impact of the vehicle and the apparatus remains in a deflated state until the vehicle is recovered.

In various embodiments of the present disclosure, the apparatus can include a number of wired and/or wireless sensors. For instance, in some embodiments, the apparatus can include a pressure sensor on at least one of the number of inflatable members and/or on the inflatable base.

In such embodiments, the opening or closing of a number of deflation vents can be based on a pressure change detected by the pressure sensor. For example, a detected rise in pressure (e.g., due to a vehicle impact) within a number of the inflatable members can trigger the opening of a number of deflation vents.

In various embodiments, the inflation source can be controlled based on the pressure sensor information. For instance, the amount of fluid provided by the inflation source can be adjusted to maintain a particular pressure within the apparatus and/or a number of its inflatable members. In such embodiments, a detected rise in pressure may trigger a shutdown of the inflation source.

In various embodiments, the portable package can include an attachment mechanism allowing the portable package to be transported on the exterior of a vehicle. For example, the portable package can be transported on a land vehicle such as a truck, or on a sea vehicle, such as a ship. Such an attachment mechanism can be, for instance, straps secured to the portable package and having ability to be secured to fixtures on a vehicle. Other attachment mechanisms can include the use of magnet locks, vacuum locks, friction locks, and/or other fasteners. Embodiments are not limited to the given examples of attachment mechanisms.

In one or more embodiments, the portable package can include a number of interior portions (e.g., compartments). For example, an inflatable member can be housed in a first portion and an inflation source can be housed in a second portion of the portable package. In embodiments where the inflation source is coupled to a power supply (e.g., a fan coupled to a battery), the power supply can be housed with the inflation source (e.g., in the second portion of the portable package).

DETAILED DESCRIPTION

Embodiments of the present disclosure include various methods, apparatuses, and systems for vehicle recovery. Various embodiments of the present disclosure will now be described in relation to the accompanying drawings, which will at least assist in illustrating the various features of the various embodiments.

Figure 1A:
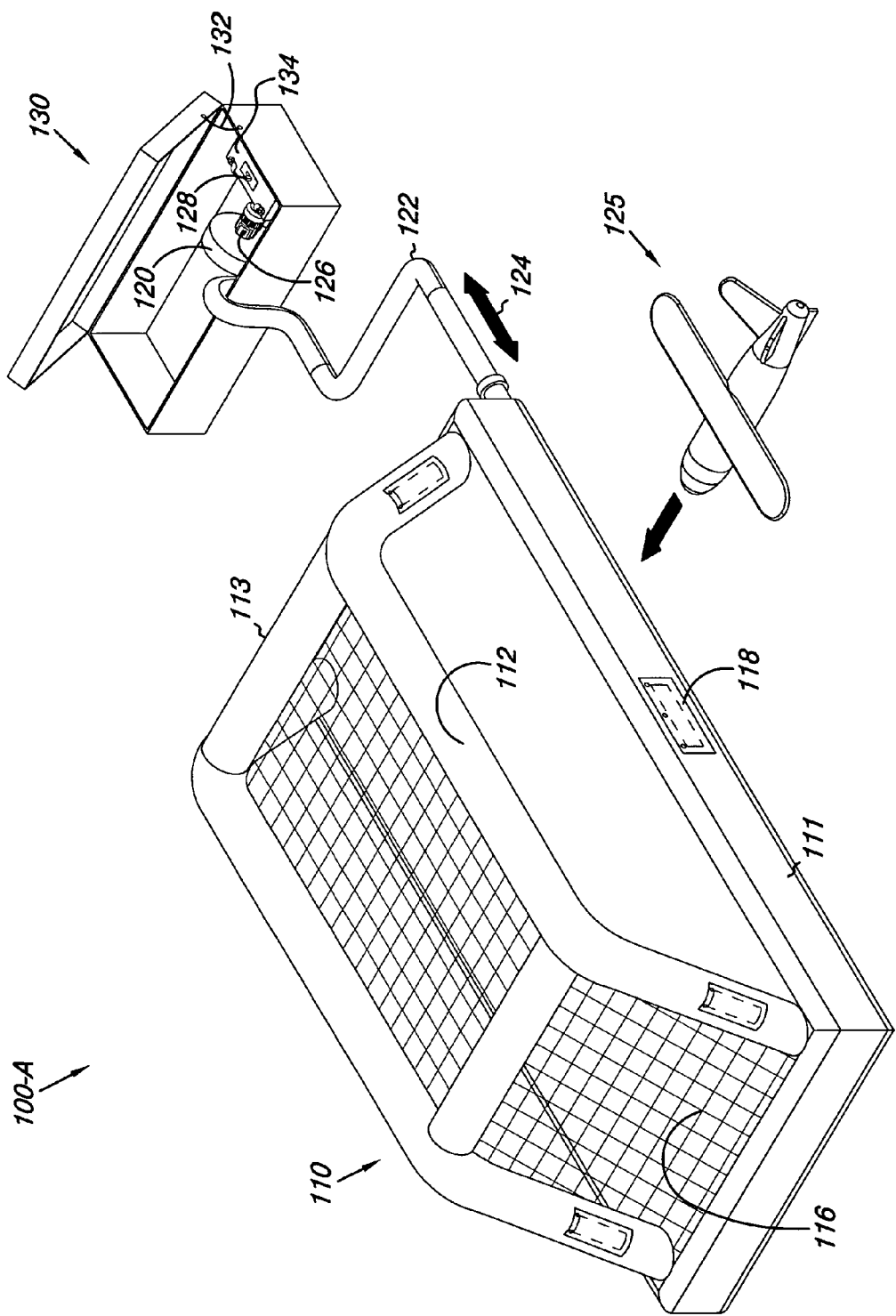
FIG. 1A illustrates a vehicle recovery apparatus according to an embodiment of the present disclosure.

FIG. 1A illustrates a vehicle recovery apparatus according to an embodiment of the present disclosure. In the embodiment illustrated in FIG. 1A, the apparatus 100-A includes an inflatable member 110 for impact of a vehicle 125 thereon, an inflation source 120 coupled to the inflatable member 110, and a portable package 130.

The inflatable member 110 illustrated in FIG. 1A includes inflatable support components, for example, a lower support component 111, two vertical support components 112, and two horizontal support components 113 in fluid communication with each other. Embodiments are not limited to an inflatable member 110 with the number or configuration of components illustrated in FIG. 1A. Examples of additional inflatable members are provided in application Ser. No. 11/644,141, entitled, "Vehicle Recovery," by the same inventors, and having a common assignee.

In some embodiments, the inflatable member 110 can include a netting 116, as illustrated between the horizontal support components 113, between each horizontal support component 113 and the lower support component 111, and between one of the vertical support components 112, and the lower support component 111. While embodiments are not limited to the use of netting 116 illustrated, in FIG. 1A, the illustration may be similar to a soccer goal in that a vehicle 125 (e.g., an unmanned aerial vehicle), can enter the inflatable member 110 through one vertical face, but may be trapped by netting 116 on any other vertical face, as a soccer ball can enter a goal through one vertical face, but cannot escape or enter through any of the other three vertical faces.

The netting 116 can be nylon netting or netting made of other suitable materials that can hold the components of the inflatable member 110 together or provide a capture portion of the inflatable member 110 among other functions. The netting 116 can have any suitable mesh size. In some embodiments, the mesh size of netting 116 can be, for example, about 10 cm by 10 cm or larger in order to facilitate air flow between the support members to reduce wind effects on the inflatable member 110. Other larger or smaller mesh sizes may provide such functionality, among other functions.

In various embodiments, the inflatable member 110 can include deflation vents 118 that can be sized so as to maintain an inflation pressure within the inflatable member 110 to maintain an inflated state. The pressure sufficient to maintain the inflated state can depend on various factors such as the material used to form the inflatable member 110, among other factors. The inflatable member 110 can be made of various materials including various nylon fabrics which may have a coating such as a silicone coating thereon. Embodiments of the present disclosure are not limited to a particular type of material or to a particular inflation pressure maintained in the inflatable member.

In the embodiment illustrated in FIG. 1A, the deflation vents 118 can be maintained in a closed state as shown, and can be opened to exhaust the fluid in the inflatable member 110, for example, after a vehicle 125 (e.g., an UAV) impacts the inflatable member 110. Such embodiments can be used alone and/or in connection with an inflation source 120 (e.g., a fan) that can be used as a deflation source as will be described in more detail below.

In the embodiment illustrated in FIG. 1A, the fluid within the support components can be exhausted through vents 118, for example, after a vehicle impact. In such embodiments, the use of vents 118 located near both ends of the support components can increase the deflation/exhaustion rate and/or can reduce or prevent fluid from being sealed within the inflatable member 110 after vehicle 125 recovery. Such embodiments can be useful to quickly deflate and repackage the inflatable member 110, for example, in hostile environments to reduce the amount of time operators of the apparatus 100-A spend in such environments when recovering a vehicle.

Embodiments of the present disclosure are not limited to the configuration shown in FIG. 1A. For example, in various embodiments, the inflatable member 110 may include more or fewer than two deflation vents 118, may be shaped differently, and/or may include portions made from different materials, among other differences.

As previously mentioned, the vehicle and the apparatus 100-A can include a number of capture mechanisms that can facilitate safe capture and recovery. For instance, the vehicle 125 may include a capture component such as hook and loop fastener material attached to a fuselage, empennage, and/or a leading edge of one or more wings of a UAV (e.g., the portions of the vehicle 125 that contact the inflatable member 110 upon impact).

In such embodiments, the inflatable member 110 (e.g., the support components and/or netting 116 therebetween) can include a capture component such as a corresponding hook and loop fastener material. Upon an impact of the vehicle 125 with the apparatus 100-A, the corresponding capture components can attach with each other to reduce movement of the vehicle which can prevent damage thereto. When mechanisms like a hook and loop are utilized, this attachment can be releasable.

The inflatable member 110 is illustrated coupled to an inflation device 120 via a coupling component 122 (e.g., a hose, or other fluid transfer device). For instance, coupling component 122 can be used to transfer fluid (e.g., air, other gases, or liquids) from the inflation source 120 to the inflatable member 110. In some embodiments, as illustrated by the bidirectional arrow 124, the coupling component 122 can be used to remove fluid from the inflatable member 110. For example, in embodiments where the inflation source 120 is a fan, the fan can be reversed to remove fluid from the inflatable member 110.

In one or more embodiments, the inflation source 120 can be coupled directly to the inflatable member 110 (e.g., via a valve between the inflation source and the inflatable member 110, without the use of a coupling component 120 such as a hose). In such embodiments, for example, the inflatable member 110 can inflate on top of the portable package 130, as is illustrated and discussed in more detail in connection with FIG. 1B.

In various embodiments, the portable package 130 can house an inflation source 120 and inflatable member 110. Although the inflatable member 110 is illustrated in its inflated state in FIG. 1A, it is illustrated in a deflated state in FIG. 2A, for example, housed in the portable package. Embodiments including a coupling component 122, such as a hose, can have the coupling component 122 stored in the portable package 130.

The embodiment illustrated in FIG. 1A shows an inflation source 120 and power supply 134 for the inflation source 120 housed in the portable package 130. For example, the inflation source 120 and/or power supply 134 can be operated by a switch (e.g, switches 126 and 128 illustrated in FIG. 1A) to activate the inflation source 120 for inflating the inflatable member 110. In some embodiments, opening the portable package 130 can activate the inflation source 120 (e.g., by tripping a sensor 132 that detects when the portable package 130 is open).

Figure 1B:
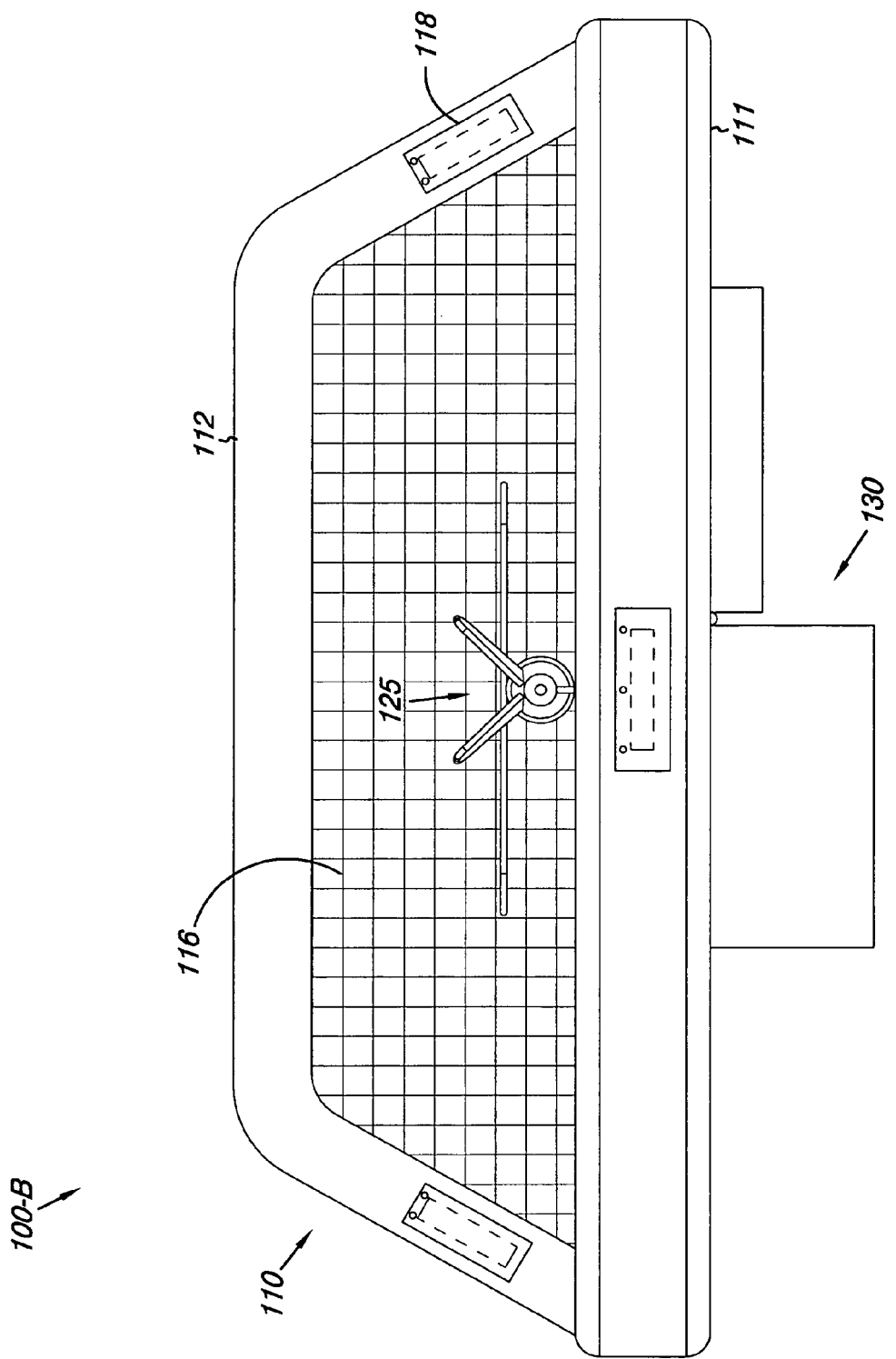
FIG. 1B illustrates a vehicle recovery apparatus according to an embodiment of the present disclosure.

FIG. 1B illustrates a vehicle recovery apparatus according to an embodiment of the present disclosure. The embodiment illustrated in FIG. 1B shows the apparatus 100-B including an inflatable member 110 in an inflated state on top of a portable package 130. The illustration of FIG. 1B shows a vehicle 125 recovered within the inflatable member 110.

Although the inflatable member 110 includes a lower support component 111, the portable package 130, for example, serves as an additional base for the inflatable member 110. In some embodiments, the inflatable member 110 inflates automatically upon opening of the portable package 130, for example, by tripping a sensor such as sensor 132 illustrated in FIG. 1A. In such embodiments, it may be useful to use the portable package 130, at least partially, as a base for the inflatable member 110 when it is in an inflated state.

The inflatable member 100 illustrated in FIG. 1B includes vertical support members 112 with deflation vents 118 and netting 116. For example, netting 116 may assist in recovering a vehicle 125, such as a UAV. Deflation vents 118 may assist in quickly deflating the inflatable member 110 for repackaging into the portable package 130. When the inflatable member 110 is in a deflated state, it can be housed in the portable package 130. As described above, embodiments are not limited to this particular configuration of an inflatable member 110.

Although not illustrated in FIG. 1B, the portable package 130 can house an inflation source, such as inflation source 120 illustrated in FIG. 1A. For example, the inflation source may be coupled to the inflatable member 110 via a coupling component, such as coupling component 122 illustrated in FIG. 1A.

In some embodiments, the inflation source may be housed within the inflatable member 110. For example, in embodiments where the inflation source is provided by a rapid chemical reaction, a container suitable for storing such chemicals can be provided within, an in various embodiments affixed to, for example, one or more of the support members (e.g., vertical support member 112) of the inflatable member 110.

Figure 2A:
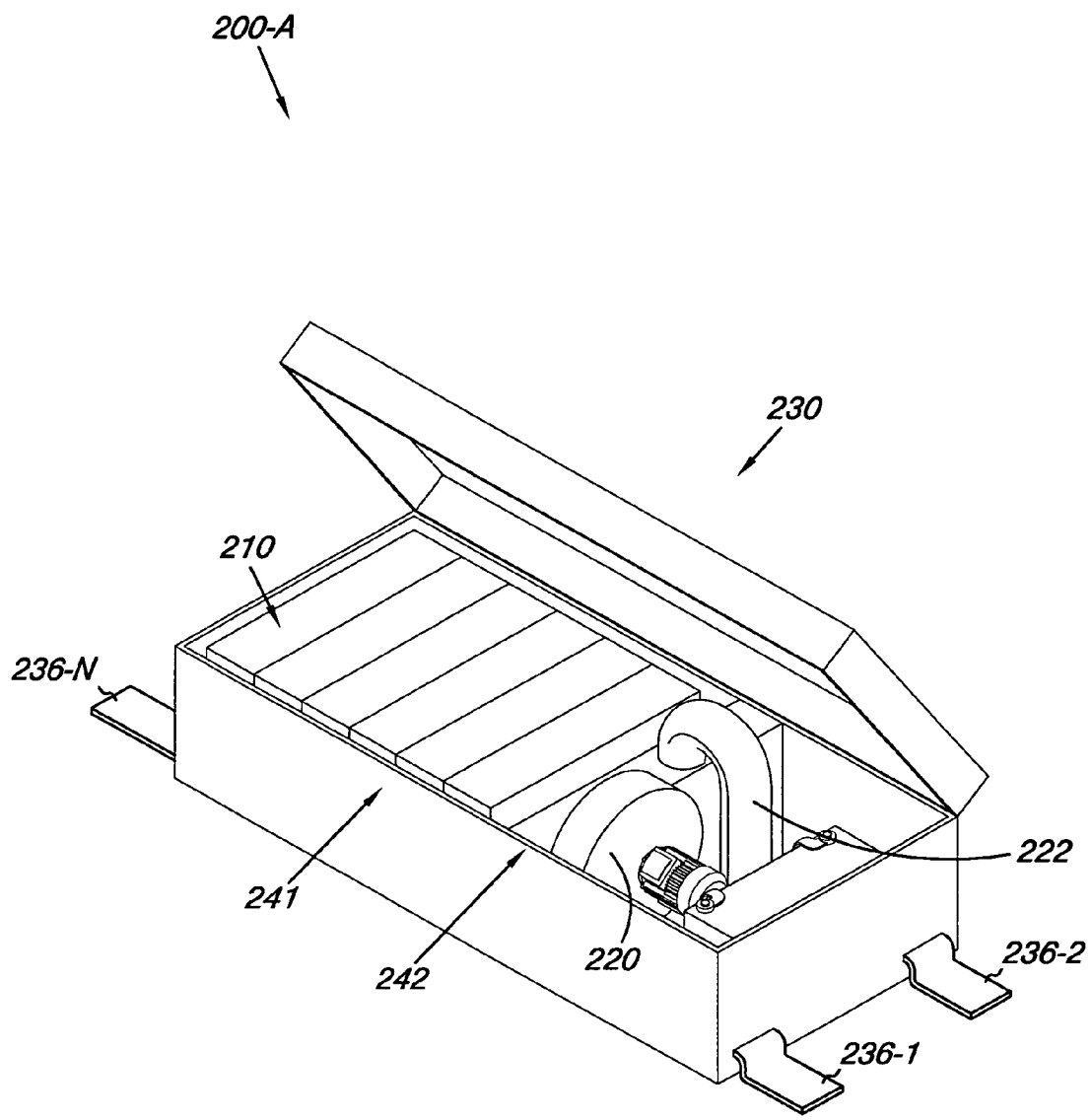
FIG. 2A illustrates a vehicle recovery system according to an embodiment of the present disclosure.

FIG. 2A illustrates a vehicle recovery system according to an embodiment of the present disclosure. The embodiment illustrated in FIG. 2A shows the system 200-A including a portable package 230 housing at least an inflatable member 210 in a first interior portion 241 of the portable package 230 and an inflation source 220 in a second interior portion 242 of the portable package 230.

The portable package 230 can house, for example, a power supply 234 for the inflation source 220 and a coupling component 222 between the inflation source 220 and the inflatable member 210. In some embodiments, the power supply 234 can be stored in the second interior portion 242 of the portable package 230. Embodiments are not limited to the specific configurations of components illustrated herein. For example, embodiments where the inflation source is a compressed gas (e.g., air) canister may not require a power supply.

The embodiment illustrated in FIG. 2A includes one or more attachment mechanisms 236-1, 236-2, and 236-N on the portable package 230 that can be used, for instance, to attach the portable package 230 to a vehicle such as a land or sea vehicle. The designator N indicates that any number of attachment mechanisms may be used with various embodiments of the present disclosure.

An attachment mechanism (e.g., attachment mechanism 236-1) may include, for instance, a latch or strap that can be used to secure the portable package 230 to a vehicle, for example, on a luggage rack. Embodiments involving latches to attach portable package 230 may include latches formed from any suitable metal or composite material, for example.

Embodiments involving straps to attach portable package 230 may include straps formed from leather, canvas, nylon, ripstop, CORDURA®, KEVLAR®, and/or other suitably durable materials. Embodiments are not limited to the specific examples of materials given herein.

In some embodiments, the attachment mechanism can involve the use of complimentary magnets. For example, where at least one magnet of a first polarity (e.g., positive) can be fixed to the portable package 230, and at least one magnet of a second polarity (e.g., negative) can be fixed to a vehicle for transporting the portable package 230.

Figure 3A:
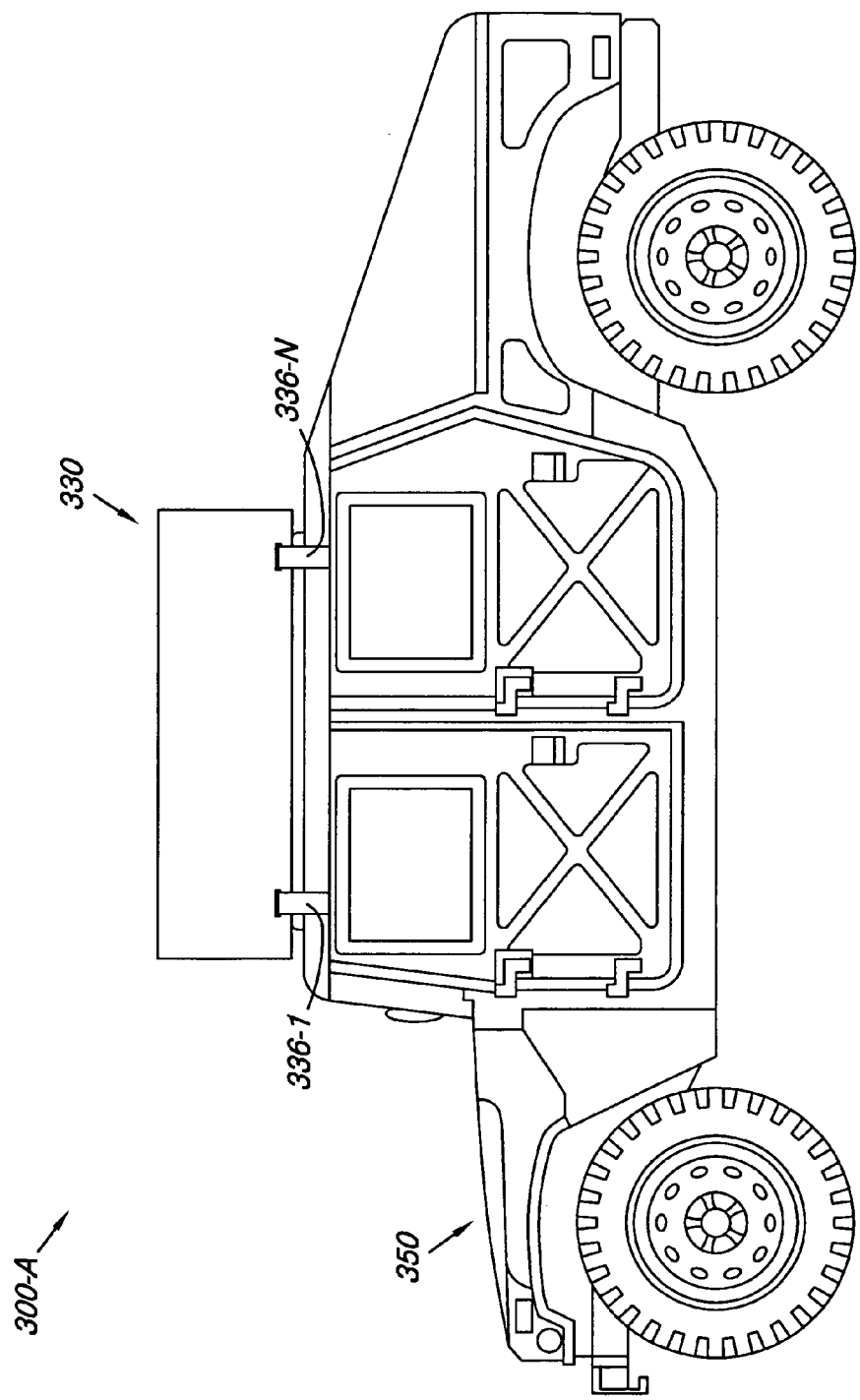
FIG. 3A illustrates a vehicle recovery apparatus transported according to an embodiment of the present disclosure.
Figure 3B:
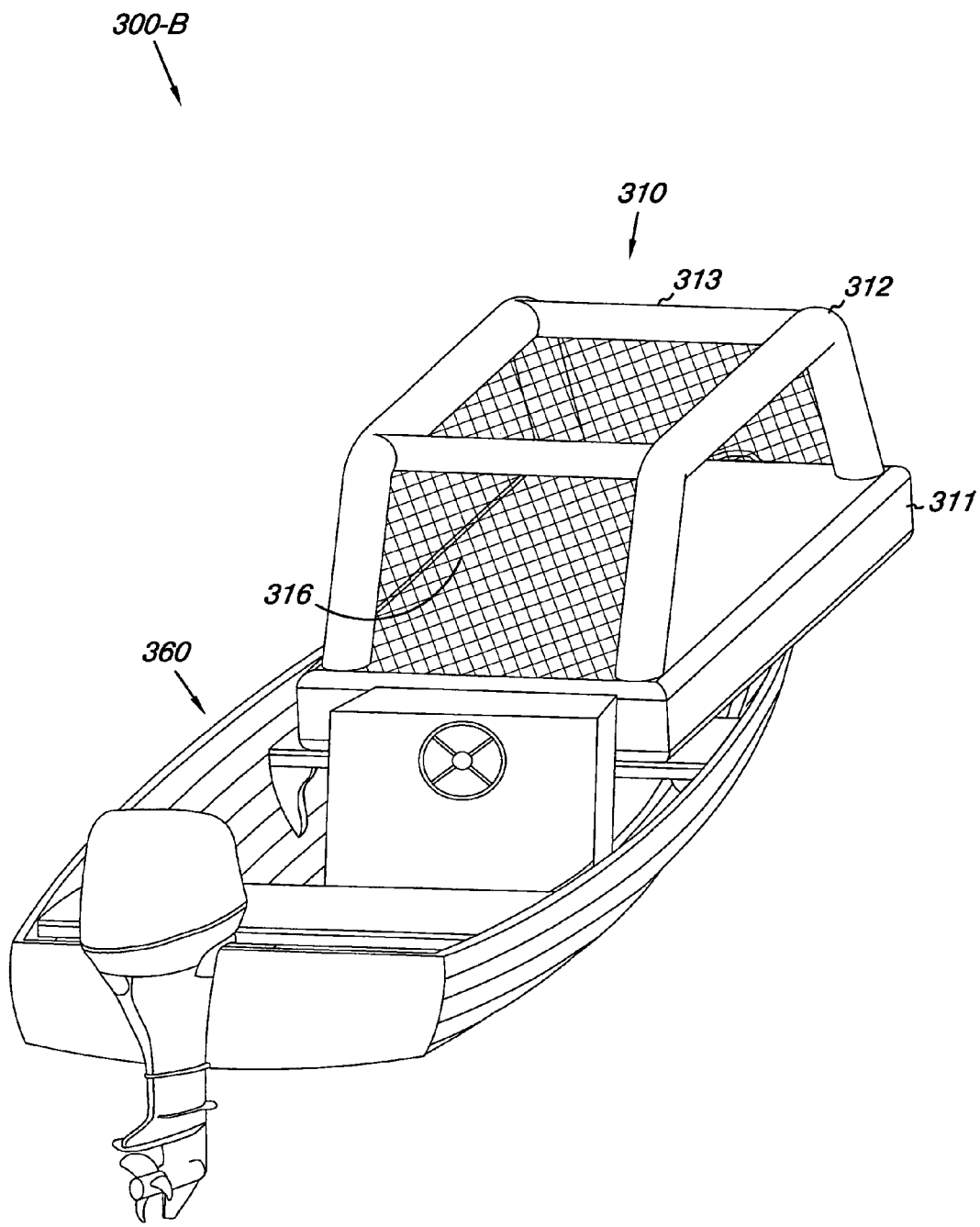
FIG. 3B illustrates a vehicle recovery apparatus transported and inflated according to an embodiment of the present disclosure.

In some embodiments, the portable package 230 may be transported and/or operated on the exterior of a truck or ship, as will be illustrated in FIGS. 3A and 3B. Embodiments are not limited to the specific examples of vehicles illustrated herein.

Figure 2B:
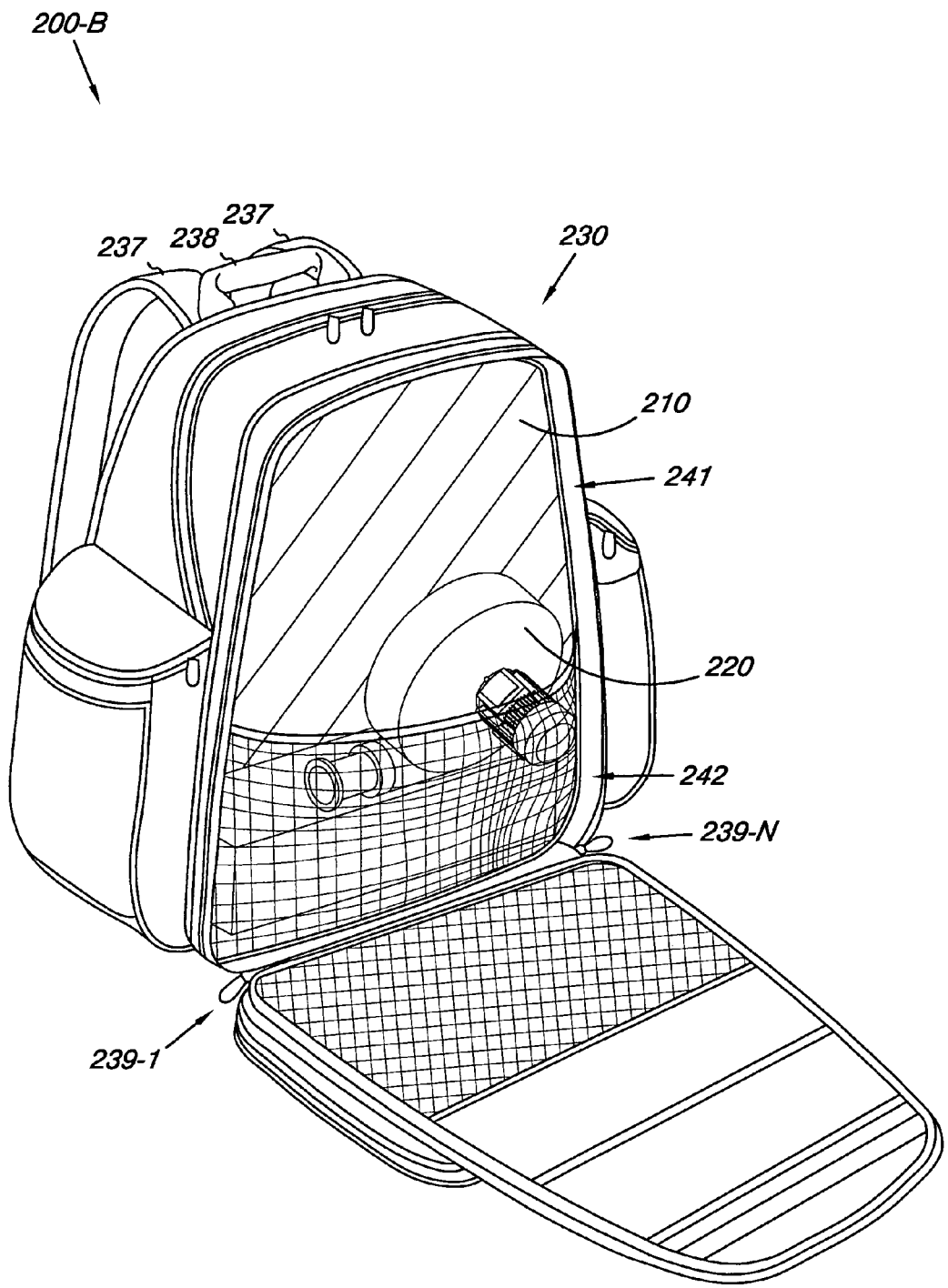
FIG. 2B illustrates a vehicle recovery system according to an embodiment of the present disclosure.

FIG. 2B illustrates a vehicle recovery system according to an embodiment of the present disclosure. The embodiment illustrated in FIG. 2B shows the system 200-B including a portable package 230 housing at least an inflatable member 210 and an inflation source 220. The embodiment of FIG. 2B illustrates the portable package 230 as a soft package (e.g., a backpack).

In some embodiments, the inflatable member 210 can be housed in a first interior portion 241 of the portable package 230. In such embodiments, the inflation source 220 can be housed in a second interior portion 242 of the portable package 230. Although the first interior portion 241 and second interior portion 242 are illustrated on a same side of portable package 230, in various embodiments, the respective interior portions could be on opposing sides of the portable package 230. Other configurations are possible.

As described above, embodiments where the portable package 230 is a backpack can be useful, for example, in allowing a user to easily transport the system 200-B into and out of areas that may be hostile without making a significant amount of noise as compared to transporting a vehicle recovery system with a truck. For example, a user of the system 200-B may desire to recover a vehicle in an area that may be inaccessible by other vehicles, such as trucks or ships. In such circumstances, transporting the portable package 230 by foot may be the only option for recovering a vehicle such as a UAV.

The portable package 230 illustrated in FIG. 2B can include at least one strap 237 for transporting the portable package 230, for example, on a user's shoulder, back, and/or around a user's waist. In some embodiments, one or more straps 237 may be used as an attachment mechanism (e.g., attachment mechanism 236 in FIG. 2A) for securing the portable package 230 to a vehicle. Portable package 230 can include a handle 238 for transport by hand.

In one or more embodiments, the portable package 230 can include a means for opening and/or closing the package such as zippers 239-1 and 239-N illustrated in FIG. 2B. The designator N indicates that any number of means 239 for opening and/or closing the portable package 230 may be included. In some embodiments, means 239 for opening and/or closing the portable package 230 can include a means for securing (e.g., locking) the portable package 230 in a closed state.

FIG. 3A illustrates a vehicle recovery apparatus transported according to an embodiment of the present disclosure. The embodiment illustrated in FIG. 3A shows the apparatus 300-A as a closed portable package 330 attached to (e.g., to the roof) a transport vehicle 350 (e.g., a truck). Portable package 330 cart be secured to the transport vehicle 350 with attachment members 336-1, 336-N, as described above with respect to FIG. 2A.

Although not illustrated in FIG. 3A, the portable package can be opened while attached to the vehicle, and the inflatable member can be inflated in such a configuration. Furthermore, the apparatus 300-A can be used to recover vehicles (e.g., UAVs) while the portable package 330 is attached to a vehicle. In some embodiments, recovering vehicles in such a configuration can allow one or more operators of the apparatus 300-A to quickly depart from a hostile area. For example, one or more operators of the apparatus 300-A can remain in a position of cover while a vehicle is recovered.

FIG. 3B illustrates a vehicle recovery apparatus transported and inflated according to an embodiment of the present disclosure. The embodiment illustrated in FIG. 3B shows the apparatus 300-B as an open portable package 330 attached to (e.g., to the deck) a transport vehicle 360 (e.g., a ship). The inflatable member 310 is illustrated in an inflated state. Drawings are not to scale.

The inflatable member 310, as illustrated in FIG. 3B, can include a lower support component 311, two vertical support components 312, two horizontal support components 313, and netting 316. Although not seen in FIG. 3B due to aspect, a portable package can provide additional support for lower support component 311.

The portable package and inflatable member 310 can be small enough to be easily transported, such as on a small transport vehicle 360. For example, a transport vehicle 360 can include a small boat such as a fishing boat or ZODIAC® inflatable vessel, as may be used by Special Forces. The inflatable member 310 may be inflated and operated to recover a vehicle while being transported by transport vehicle 360. Embodiments are not limited to use with small transport vehicles, such as transport vehicle 360. In some embodiments, a larger vessel such as an aircraft carrier may be used with apparatus 300-B.

Figure 4:
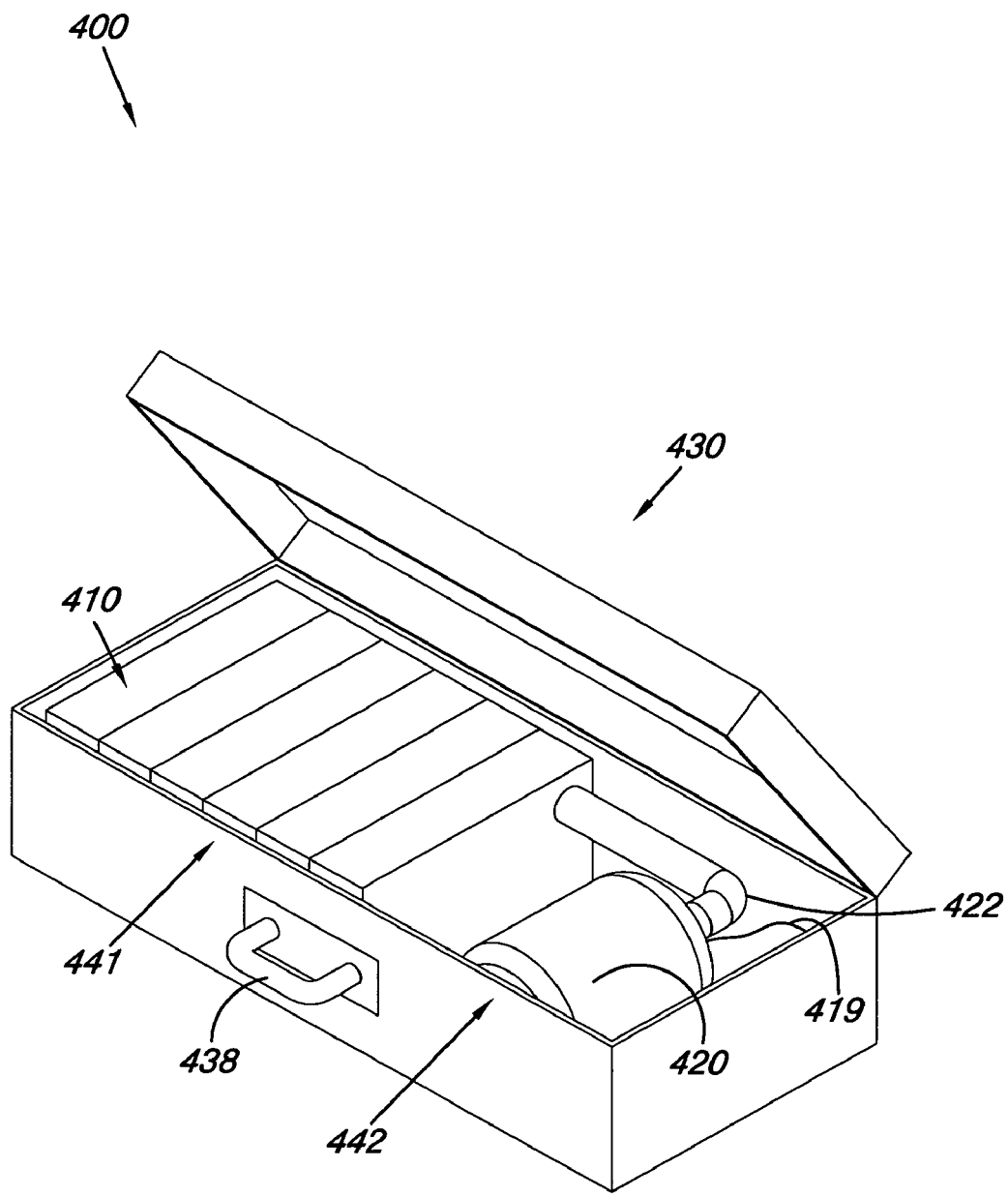
FIG. 4 illustrates a vehicle recovery apparatus according to an embodiment of the present disclosure.

FIG. 4 illustrates a vehicle recovery apparatus according to an embodiment of the present disclosure. The embodiment illustrated in FIG. 4 shows the apparatus 400 including a portable package 430 housing at least an inflatable member 410 and an inflation source 420. In some embodiments, the portable package 430 may be a hard case (e.g., a suitcase) with a handle 438 for ease of transport.

In some embodiments, the inflatable member 410 can be housed in a first interior portion 441 of the portable package 430. In such embodiments, the inflation source 420 can be housed in a second interior portion 442 of the portable package 430. Although the first interior portion 441 and second interior portion 442 are illustrated on a same side of portable package 430, in various embodiments, the respective interior portions could be on opposing sides of the portable package 430. Other configurations are possible.

The embodiment illustrated in FIG. 4 shows the inflatable member 410 in a deflated state housed in the portable package 430. The inflatable member 410 can be coupled to the inflation source 420 by a coupling component 422.

The embodiment of FIG. 4 illustrates the inflation source 420 as a canister rather than, for example, a fan. As described above, in some embodiments, the inflation source 420 can be provided as a compressed gas (e.g., air) canister, or can be provided by an explosive source (e.g., a rapid chemical reaction) such as ignition of sodium azide ($NaN_3$), for instance. Although illustrations of inflation source including fans and canisters have been provided herein, embodiments are not so limited.

As described above, embodiments including the use of a container, such as a canister, as at least part of an inflation source 420, can be housed within the inflatable member 410. Although not illustrated in FIG. 4, the inflation source 420 can be housed within the inflatable member 410, and thus within the portable package 430 when the inflatable member is in a deflated state.

The apparatus 400 in FIG. 4A includes a cord 419 coupled to the inflation source 420. In one or more embodiments, the inflation source can be activated by a user of the apparatus 400 pulling a cord 419. Although not illustrated in FIG. 4, in embodiments including a power supply, such as power supply 134 in FIG. 1A, a cord, such as cord 419, can be coupled to the power supply for activating a corresponding inflation source. As described above, various embodiments can include the use of a switch, sensor, or pull-cord to activate the inflation source. However, embodiments are not limited to these means of activating an inflation source.

Although specific embodiments have been illustrated and described herein, those of ordinary skill in the art will appreciate that any arrangement calculated to achieve the same techniques can be substituted for the specific embodiments shown. This disclosure is intended to cover adaptations or variations of various embodiments of the present disclosure. It is to be understood that the above description has been made in an illustrative fashion, and not a restrictive one.

Combination of the above embodiments, and other embodiments not specifically described herein will be apparent to those of ordinary skill in the art upon reviewing the above description. The scope of the various embodiments of the present disclosure includes various other applications in which the above structures and methods are used. Therefore, the scope of various embodiments of the present disclosure should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the embodiments of the present disclosure require more features than are expressly recited in each claim.

Rather, as the following claims reflect, inventive subject matter may lie in less than all features of a single disclosed embodiment. Thus, the following claims are hereby incorporated into the Detailed Description, with each claim standing on its own as a separate embodiment.

What is claimed:

1. An aerial vehicle recovery apparatus, comprising:
   an inflatable member for impact of an aerial vehicle thereon;
   an inflation source for inflating the inflatable member, the inflation source also serving as a deflation source for deflating the inflatable member, where the inflation source and the inflatable member are physically detached from the aerial vehicle prior to an impact of the aerial vehicle with the aerial vehicle recovery apparatus; and
   where the inflatable member and inflation source are both housed in a portable package when the inflatable member is in an undeployed state, the portable package including a sensor that detects when the portable package is opened such that the inflation source is activated and the inflatable member is automatically inflated upon opening of the portable package, and where the portable package is transportable by hand.

2. The apparatus of claim 1, where the inflation source is a fan coupled to a power supply housed in the portable package.

3. The apparatus of claim 1, where the inflation source is activated by operation of a switch coupled to the inflation source.

4. The apparatus of claim 1, where the inflatable member includes a capture component to releasably attach with a corresponding component on an unmanned aerial vehicle.

5. The apparatus of claim 1, where the portable package is selected from the group including a hard case and a backpack.

6. The apparatus of claim 1, where the portable package includes an attachment mechanism allowing the portable package to be transported on the exterior of one selected from the group including a land vehicle and a sea vehicle.

7. An aerial vehicle recovery system, comprising:
- a portable package transportable by hand and having at least a first and second interior portion;
- an inflatable member for recovering an aerial vehicle thereon, where the inflatable member is housed within a first interior portion of the portable package when in an undeployed state; and
- an inflation source for inflating the inflatable member, where the inflation source also serves as a deflation source for deflating the inflatable member and is housed within a second interior portion of the portable package when the inflatable member is in the undeployed state, where the inflation source and the inflatable member are physically detached from the aerial vehicle prior to an impact of the aerial vehicle with the aerial vehicle recovery apparatus, and where the portable package includes a sensor that detects when the portable package is opened such that the inflation source is activated and the inflatable member is automatically inflated upon opening of the portable package.

8. The system of claim 7, where the inflation source is a fan coupled to a power supply, and where the power supply is housed within the second interior portion of the portable package.

9. The system of claim 7, where the portable package is a suitcase.

10. The system of claim 7, where the portable package serves as at least a portion of a base for the inflatable member, when the portable package is open and the inflatable member is inflated.

11. The system of claim 7, where the inflatable member includes a netting to aid in recovering the aerial vehicle.

12. The system of claim 7, where the inflation source is a reversible fan.

13. A method for recovering an aerial vehicle, comprising:
- triggering a sensor coupled to a portable package by opening the portable package, the portable package is transportable by hand;
- where opening the portable package activates an inflation source to automatically inflate an inflatable member, where the inflation source also serves as a deflation source for deflating the inflatable member, where the inflation source and inflatable member are housed in the portable package when the inflatable member is in an undeployed state, and where the inflation source and the inflatable member are physically detached from an unmanned aerial vehicle (UAV) prior to an impact of the UAV with the inflatable member; and
- recovering the UAV with the inflatable member.

14. The method of claim 13, where activating the inflation source includes operating a switch that controls a reversible fan coupled to a power supply that is also housed in the portable package when the inflatable member is in the undeployed state.

15. The method of claim 14, where the method includes: activating the reversible fan to deflate the inflatable member; and repackaging the inflatable member in the portable package.

16. The method of claim 13, where the portable package is a suitcase, and where the method includes transporting the suitcase by hand.

* * * * *